(12) United States Patent
Kneidel et al.

(10) Patent No.: US 8,287,389 B2
(45) Date of Patent: Oct. 16, 2012

(54) LOW FRICTION ARC SPRING DAMPER (75) Inventors: Craig Kneidel, Massillon, OH (US);
Srivatsan Kannan, Hyderabad (IN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 265 days.

(21) Appl. No.: 12/692,186

(22) Filed: Jan. 22, 2010

(65) Prior Publication Data

US 2010/0187066 A1 Jul. 29, 2010

Related U.S. Application Data (60) Provisional application No. 61/206,055, filed on Jan. 27, 2009.

(51) Int. Cl.
*F16D 3/12* (2006.01)
(52) U.S. Cl. .................................................. 464/67.1
(58) Field of Classification Search ................. 464/66.1, 464/67.1, 68.1, 68.9; 192/203
See application file for complete search history.

(56) References Cited

U.S. PATENT DOCUMENTS

| | | | |
|---|---|---|---|
| 937,291 A * | 10/1909 | Eaton | 464/66.1 X |
| 4,702,721 A | 10/1987 | Lamarche | |
| 5,562,543 A | 10/1996 | Röhrle | |
| 5,996,761 A | 12/1999 | Teramae | |
| 6,176,362 B1 | 1/2001 | Arhab | |
| 6,371,857 B1 | 4/2002 | Kono et al. | |
| 7,241,225 B2 | 7/2007 | Ronner | |

* cited by examiner

*Primary Examiner* — Gregory Binda
(74) *Attorney, Agent, or Firm* — Simpson & Simpson, PLLC (57) ABSTRACT

An arc spring damper, including: a plurality of arc springs, a driving flange having a plurality of driving spring segment, a driven flange having a plurality of driven spring segments, and a ring plate including a plurality of radially extending retention segments. Each arc spring in the plurality of arc springs includes a passageway with first and second openings at first and second longitudinal ends, respectively, for the arc spring. Each driving spring segment includes a circumferentially extending driving portion and each driven spring segment includes a circumferentially extending driven portion. For each spring, a respective driving portion passes through the first opening into the passageway and a respective driven portion passes through the second opening into the passageway. Each radially extending segment from the plurality of radially extending segments is connected to and rotatable with a spring from the plurality of arc springs and radially restrains the arc spring.

7 Claims, 6 Drawing Sheets

LOW FRICTION ARC SPRING DAMPER

CROSS-REFERENCE TO RELATED APPLICATIONS

This application claims the benefit under 35 U.S.C. §119(e) of U.S. Provisional Application No. 61/206,055 filed Jan. 27, 2009, which application is incorporated herein by reference.

FIELD OF THE INVENTION

The invention relates to a damper with arc springs that are radially restrained with nominal frictional losses for the springs. The invention also relates to a damper with arc springs and a displaceable driving member.

BACKGROUND OF THE INVENTION

The prior art teaches the use of radial restraining structures for arc springs in a damper that interleave between adjacent coils of the arc springs. The prior art also teaches a non-axially displaceable connection of driving members with a damper using arc springs.

BRIEF SUMMARY OF THE INVENTION

The present invention broadly comprises an arc spring damper, including: a plurality of arc springs, a driving flange having a plurality of driving spring segment, a driven flange having a plurality of driven spring segments, and a ring plate including a plurality of radially extending retention segments. Each arc spring in the plurality of arc springs includes a passageway with first and second openings at first and second longitudinal ends, respectively, for the arc spring. Each driving spring segment includes a circumferentially extending driving portion and each driven spring segment includes a circumferentially extending driven portion. For each arc spring, a respective driving portion passes through the first opening into the passageway and a respective driven portion passes through the second opening into the passageway. Each radially extending segment from the plurality of radially extending segments is connected to and rotatable with an arc spring from the plurality of arc springs and radially restrains the arc spring.

In one embodiment, each radially extending segment axially restrains the arc spring. In one embodiment, the damper includes a plurality of axially extending clutch members and each clutch member from the plurality of clutch members is circumferentially disposed between a respective driving spring segment and a respective driven spring segment and is engageable with the respective driving and driven spring segments. In one embodiment, the damper includes a piston plate including the plurality of axially extending clutch members.

In one embodiment, the damper includes a carrier plate with a plurality of openings and each driving spring segment includes an axially extending driving tab disposed in an opening from the plurality of openings, each driven spring segment includes an axially extending driven tab disposed in an opening from the plurality of openings and the driving and driven tabs are circumferentially displaceable within the respective openings, and engageable with the carrier plate in a circumferential direction. In one embodiment, the engagement of the driving and driven tabs and the carrier plate limits compression of the plurality of arc springs.

It is a general object of the present invention to provide a damper that uses arc springs and restrains the arc springs with a minimum of frictional losses.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
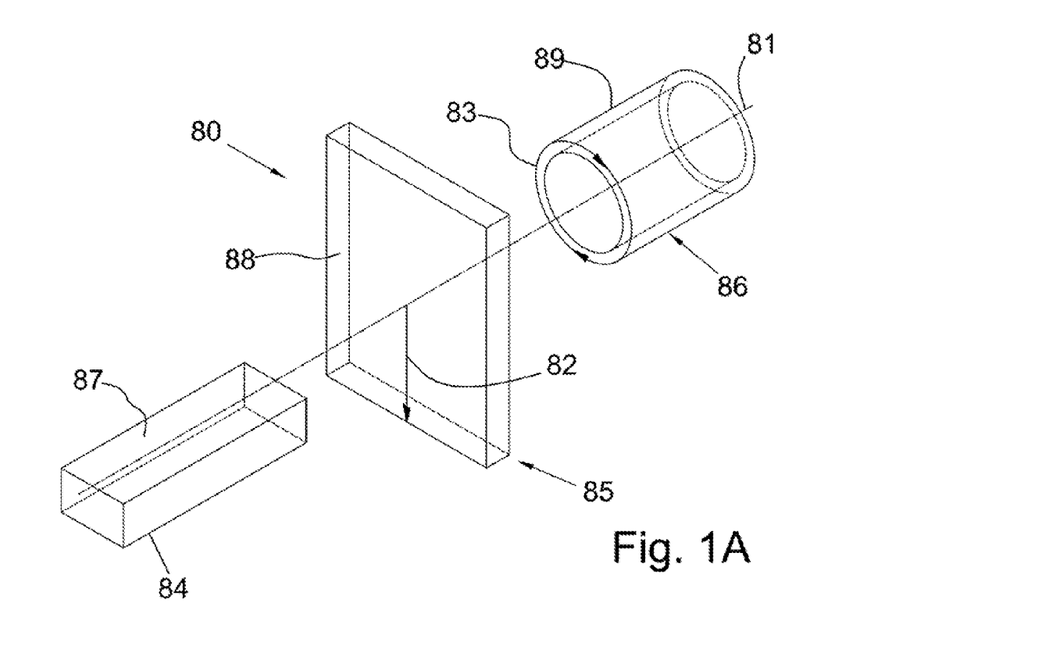
Figure 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively.

The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
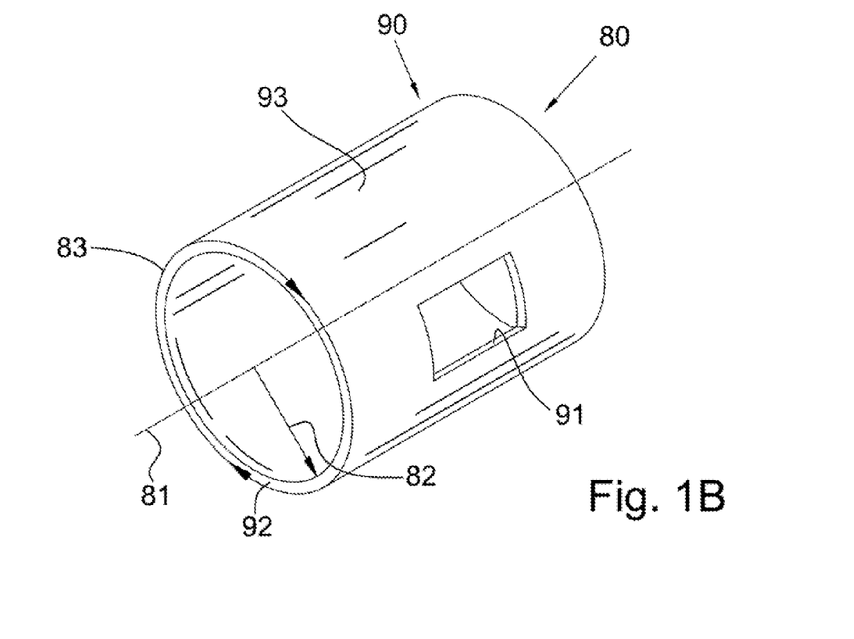
FIG. 1B is a perspective view of an object in the cylindrical coordinate system of Figure 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
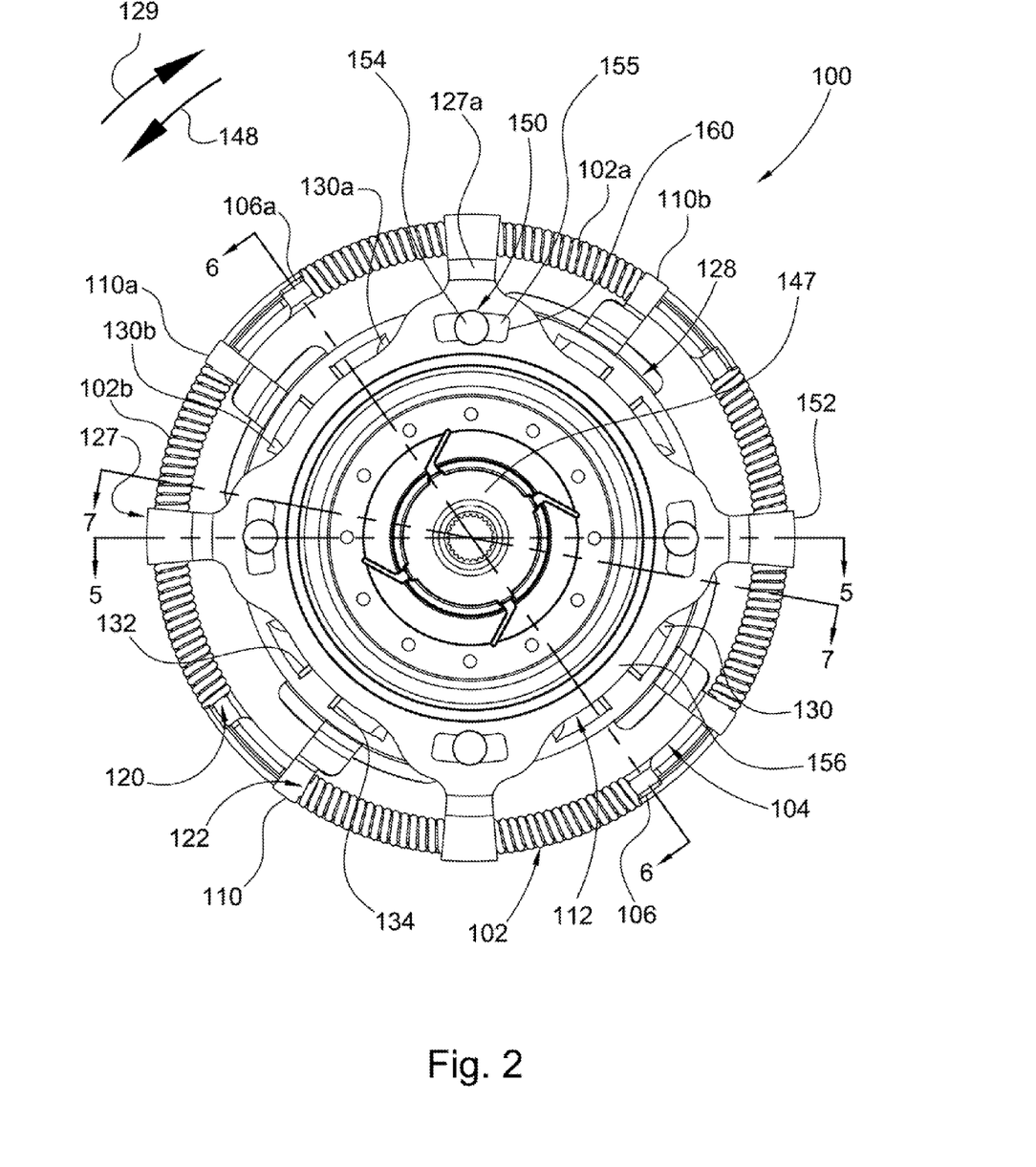
FIG. 2 is a front view of a present invention arc spring damper.

FIG. 2 is a front view of present invention arc spring damper 100.

Figure 3:
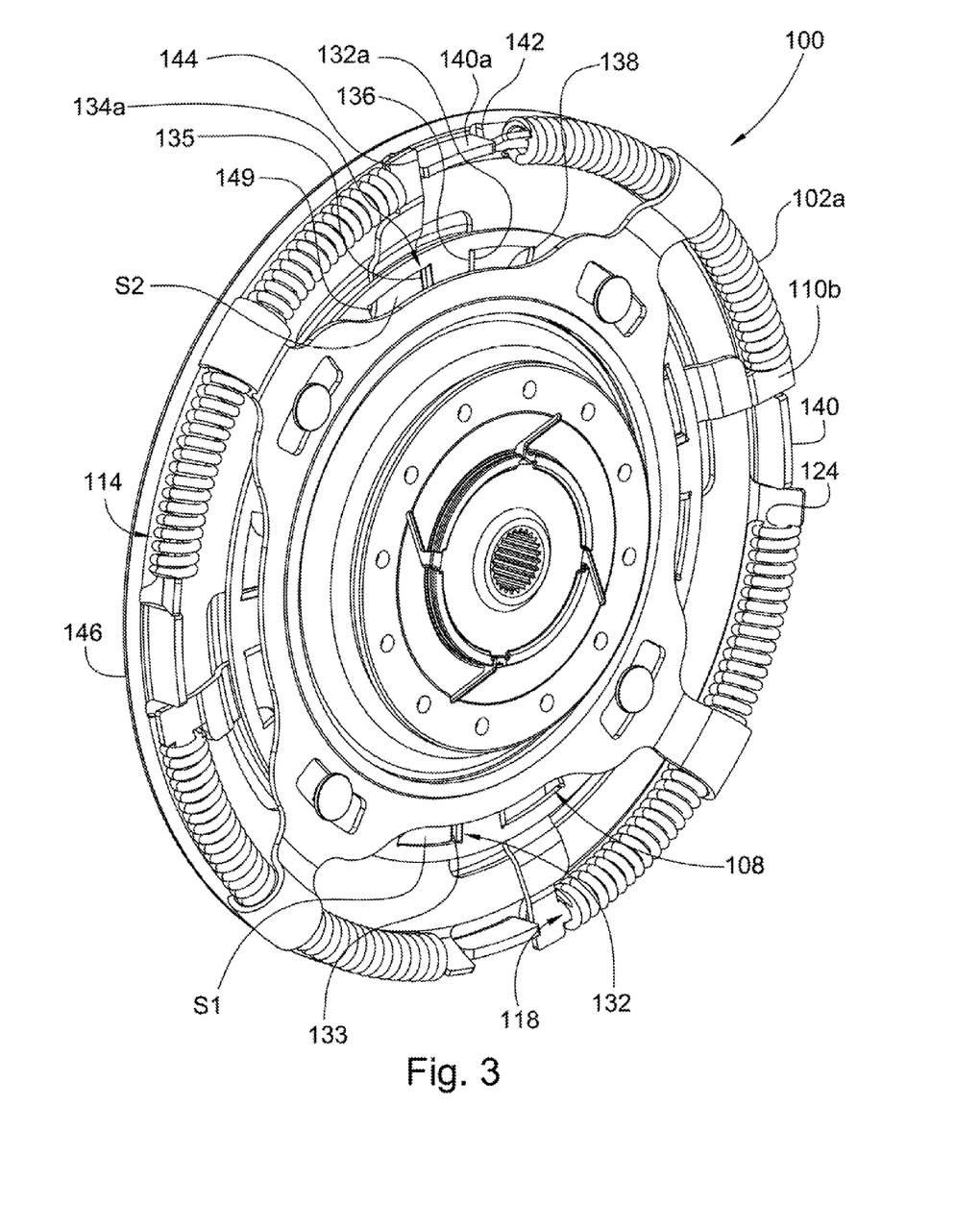
FIG. 3 is a front perspective view of the arc spring damper shown in FIG. 2.

FIG. 3 is a front perspective view of arc spring damper 100.

Figure 4:
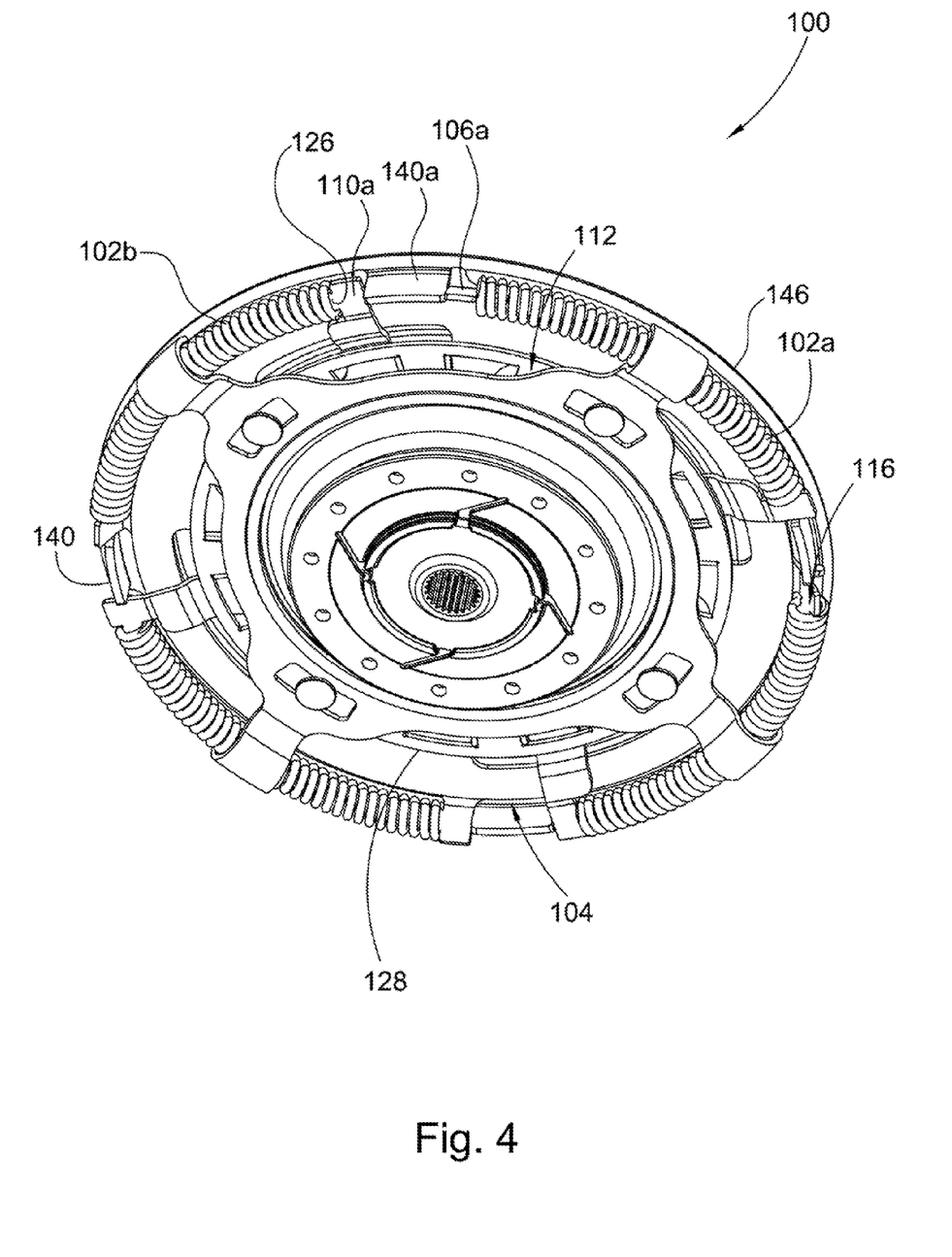
FIG. 4 is a front perspective view of the arc spring damper shown in FIG. 2.

FIG. 4 is a front perspective view of arc spring damper 100.

Figures 5, 6:
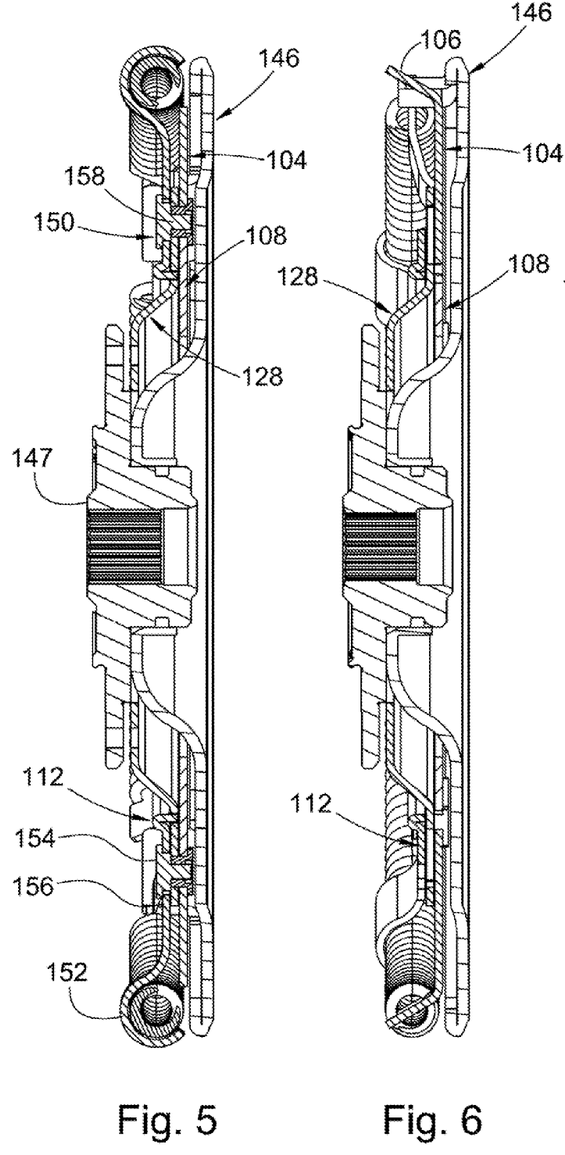
FIG. 5 is a cross-sectional view of the arc spring damper shown in FIG. 2 generally along line 5-5 in FIG. 2.
FIG. 6 is a cross-sectional view of the arc spring damper shown in FIG. 2 generally along line 6-6 in FIG. 2.
Figure 7:
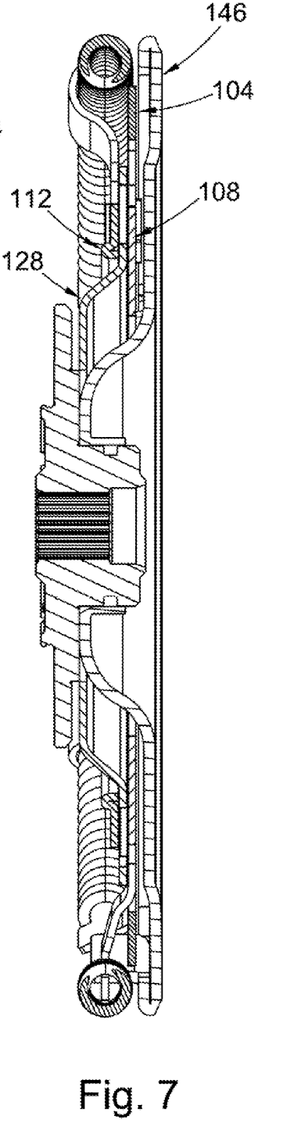
FIG. 7 is a cross-sectional view of the arc spring damper shown in FIG. 2 generally along line 7-7 in FIG. 2; and, FIG. 8 is a perspective view of the driving flange and driven flange shown in FIGS. 2 and 3.
Figure 8:
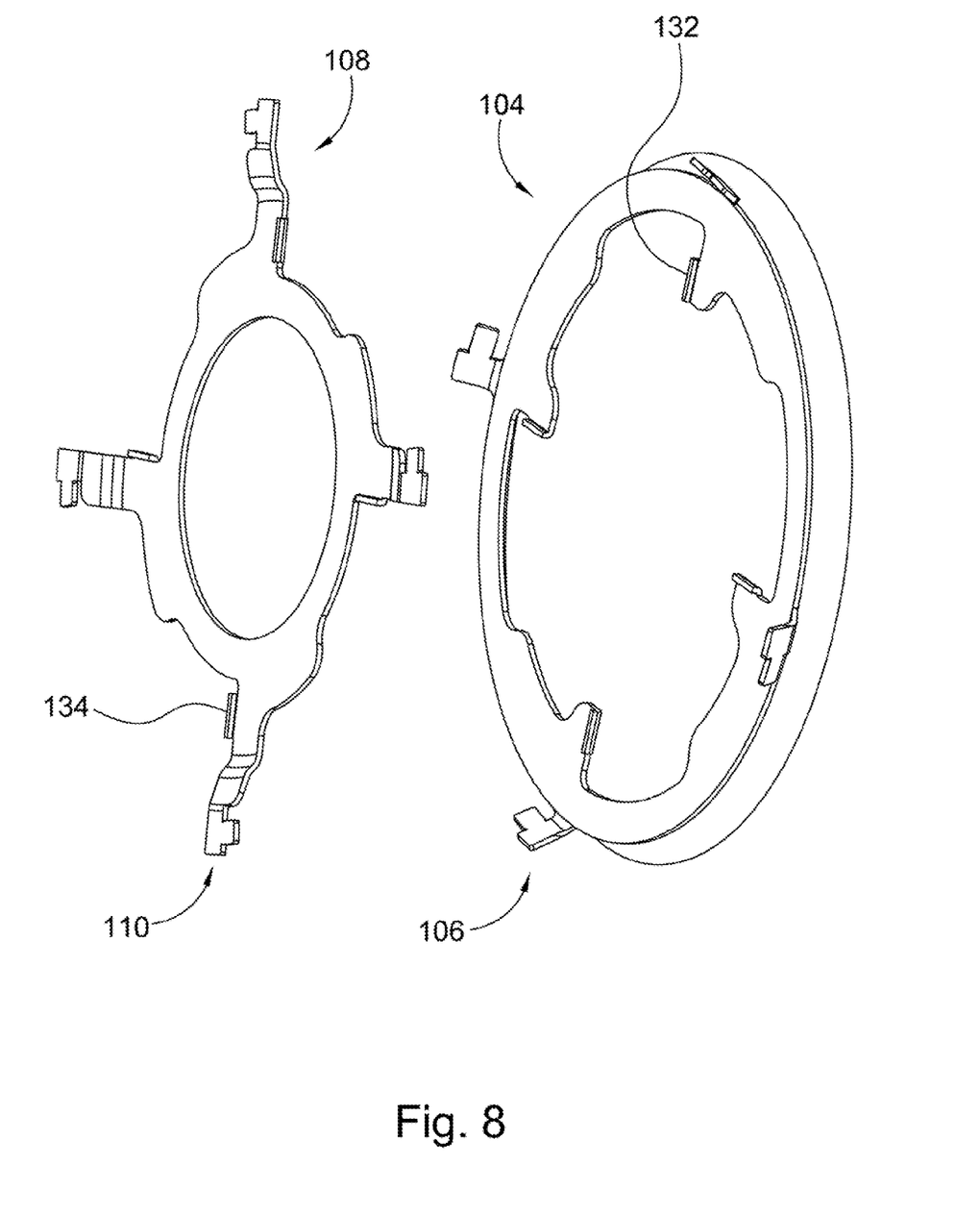

FIGS. 5 through 7 are respective cross-sectional views of arc spring damper 100 generally along lines 5-5, 6-6, and 7-7, respectively, in FIG. 2. FIG. 8 is a perspective view of the driving flange and driven flange shown in FIGS. 2 and 3. The following should be viewed in light of FIGS. 2 through 8. Damper 100 includes a plurality of arc springs 102, driving flange 104 with a plurality of driving spring segments 106, driven flange 108 with a plurality of driven spring segments 110, and ring plate 112. Each arc spring in the plurality of arc springs, for example, spring 102A, includes passageway 114 with openings 116 and 118 at longitudinal ends 120 and 122, respectively, for the arc spring. For example, the passageway is an internal channel formed by the coil structure of the spring. Each driving spring segment includes a circumferentially extending driving portion 124 and each driven spring segment includes a circumferentially extending driven portion 126.

The ring plate includes a plurality of radially extending retention segments 127. Each radially extending segment is connected to and rotatable with an arc spring from the plurality of arc springs and radially and axially restrains the arc spring. For example, as the flange and segment 106A rotate in rotational direction 129, spring 102A compresses, causing the coil structure of the spring to shift in direction 129. Segment 127A has sufficient contact with spring 102A so that the segment also rotates in direction 129 to match the shifting/rotation of the portion of spring 102A with which the segment is in contact. Thus, the ring plate is rotatable with the plurality of arc springs.

Arc spring damper 100 includes carrier plate 128 with plurality of openings 130. Each driving spring segment includes axially extending driving tab 132 disposed in an opening from the plurality of openings, circumferentially displaceable within the opening, and engageable with the carrier plate in a circumferential direction. Each tab 132 includes portion 133 axially extending from surface S1 of a respective driving spring segment. Each driven spring segment includes axially extending driven tab 134 disposed in an opening from the plurality of openings, circumferentially displaceable within the opening, and engageable with the carrier plate in a circumferential direction. Each tab 134 includes portion 135 axially extending from surface S2 of a respective driven spring segment. For example, driving tab 132A is disposed in and circumferentially displaceable within opening 130A and is engageable with surfaces 136 and 138 for the opening. The function of the tabs is further described infra.

Arc spring damper 100 includes a plurality of axially extending clutch members 140. Each clutch member is circumferentially disposed between adjacent driving and driven spring segments, is engageable with the adjacent spring segments, and is axially displaceable with respect to the adjacent spring segments. For example, member 140A is circumferentially disposed between spring segments 106A and 110A, is engaged with surfaces 142 and 144, respectively for the spring segments, and is axially displaceable with respect to spring segments 106A and 110A. In one embodiment, damper 100 includes piston plate 146, which includes the clutch members.

The flanges are driven by clutch members 140. In one embodiment, members 140 are tabs in piston plate 146. The configuration of members 140 and segments 106 and 110 enables axial displacement of the piston plate with respect to the remainder of the damper, which in turn, facilitates operation of other components, such a clutch (not shown) of which the piston plate forms a part. For example, the clutch could be in a torque path to the damper and the axial displacement of the piston enables opening and closing of the clutch.

The arc springs of damper 100 advantageously provide a low spring rate, which is desirable in a damper. Further, the configuration of segments 127 provide retention, in particular, radial retention, of the arc springs with little of no frictional loss. For example, as described supra, segments 127 and the arc springs rotate in unison, rather than having the arc springs rotate through and against a fixed radial retention structure.

The following is a description of an operation of damper 100. In a power transmission mode, springs 102 are driven by a flange 104, in particular, by driving spring segments, for example, segment 106A, in direction 129. The driving spring segments and the arc springs are connected via protrusions 124 which extend into the internal space, for example, passageway 114, formed by the coil structure of the arc coils. Radially extending retention segments 127 constrain, in particular, radially restrain, the arc springs under rotational speed. As noted, as the springs rotate/compress ("wind up"), the respective segments 127 move/rotate along with the springs. Because the respective segments 127 move/rotate along with the springs, there is little or no friction between the respective segments 127 and the arc springs.

The spring force from the driving spring segments is reacted against respective driven spring segments such as segment 110B. Tabs 132 enable torque to be transferred from the driving flange to the carrier plate. For example, driving torque from tab 140A causes segment 106A to displace in direction 129, compressing spring 102A. When segment 106A rotates far enough in direction 129, protrusion 132A contacts surface 138 of window 130A and torque from the driving flange is transferred to the carrier plate via the contact of protrusion 132A with surface 138. The carrier plate can then transfer torque, for example, to an output of the damper, by any means known in the art, for example, by connection to hub 147. The contact of protrusions 132 with surfaces such as 138 also prevents undesirable over-compression of the arc springs, for example, arc spring 102A is not further compressed once protrusion 132A contacts surface 138.

In a coast mode, torque is applied to the damper in direction 148, opposite direction 129. Tabs 134 enable torque to be transferred from the driven spring segments to the carrier plate. For example, coasting torque from tab 140A causes segment 110A to displace in direction 148, compressing spring 102B. When segment 110A rotates far enough in direction 148, protrusion 134A contacts surface 149 of window 130B. Thereafter, the torque from flange 108 is transferred to the carrier plate via the contact of protrusion 134A with surface 149. The contact of protrusions 134 with surfaces such as 149 also prevents undesirable over-compression of the arc springs, for example, arc spring 102B is not further compressed once protrusion 134A contacts surface 149. It should be understood that directions 129 and 148 can be reversed.

In one embodiment, rivets 150 are fixed to plate 128 and extend through respective openings 155 in plate 112. The diameter of head 154 of the rivet is greater than the radial extent of opening 155; therefore, the head contacts radial face 156 of plate 112 to axially restrain plate 112. Sufficient clearance is provided between the head and the face to minimize frictional losses. Body 158 of the rivet is sized to enable movement of the body in opening 155. By fixing the rivets to plate 128, the circumferential position of body 158 is limited to a relatively small arc as the carrier plate shifts from a drive to a coast position as described supra. Therefore, the circumferential position of plate 128 is similarly limited. For example, the rotation of plate 128 is halted when body 158 engages end 160 of opening 155. As a result, segments 127 remain relatively circumferentially centered on the arc springs, for example, segments 127 remain approximately halfway between ends 120 and 122, optimizing the radial retention function of segments 127.

Under rotation of the damper, the arc springs, in particular, the circumferentially centered/middle portions of the springs will tend to be displaced radially outward. Therefore, it is necessary to provide radial restraint for the middle portions. Advantageously, retention segments 127 provide such support while causing little or no frictional loss with respect to the movement of the arc springs. Ring 112 is rotationally free with the exception of the connection to the arc springs described supra. Thus, the ring is free to rotate to follow the rotation of the arc springs and create only nominal drag or friction on the arc springs. In one embodiment, ring 112 is formed as a single piece, providing maximum strength while occupying minimal axial space. For example, portion 152 of segments 127, fits around most of the diameter of the spring, eliminating any restrictions on the design or windup of the spring. The simple design of ring 112 accomplishes the intended function of radially restraining the arc springs without any additional pieces or sub-assembly requirements, which minimizes radial space requirements for the ring and damper 100.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. An arc spring damper, comprising:
   a plurality of circumferentially curved arc springs, wherein each circumferentially curved arc spring in the plurality of circumferentially curved arc springs includes a circumferentially curved passageway with first and second openings at first and second longitudinal ends, respectively, for said each circumferentially curved arc spring;
   a driving flange having a plurality of driving spring segments, each driving spring segment including a circumferentially extending driving portion;
   a driven flange having a plurality of driven spring segments, each driven spring segment including a circumferentially extending driven portion; and,
   a ring plate including a plurality of radially extending retention segments, wherein:
      for each said circumferentially curved arc spring a respective driving portion passes through the first opening into the passageway and a respective driven portion passes through the second opening into the passageway; and
      each radially extending segment from the plurality of radially extending segments is connected to a circumferentially curved arc spring from the plurality of circumferentially curved arc springs at a point between the first and second longitudinal ends, is rotatable with the circumferentially curved arc spring from the plurality of circumferentially curved arc springs, and radially restrains the circumferentially curved arc spring.

2. The arc spring damper of claim 1 wherein said each radially extending segment axially restrains the arc spring.

3. The arc spring damper of claim 1 further comprising a plurality of axially extending clutch members, wherein each clutch member from the plurality of clutch members is circumferentially disposed between a respective driving spring segment and a respective driven spring segment and is engageable with the respective driving and driven spring segments.

4. The arc spring damper of claim 3 further comprising a piston plate including the plurality of axially extending clutch members.

5. The arc spring damper of claim 1 further comprising a carrier plate with a plurality of openings and wherein each driving spring segment includes an axially extending driving tab disposed in an opening from the plurality of openings, each driven spring segment includes an axially extending driven tab disposed in an opening from the plurality of openings and wherein the driving and driven tabs are circumferentially displaceable within the respective openings, and engageable with the carrier plate in a circumferential direction.

6. The arc spring damper of claim 1 wherein the engagement of the driving and driven tabs and a carrier plate limits compression of the plurality of arc springs.

7. An arc spring damper, comprising:
   a plurality of arc springs, wherein each arc spring in the plurality of arc springs includes a passageway with first and second openings at first and second longitudinal ends, respectively, for the arc spring;
   a driving flange having a plurality of driving spring segments, each driving spring segment including a circumferentially extending driving portion and an axially extending driving tab;

a driven flange having a plurality of driven spring segments, each driven spring segment including a circumferentially extending driven portion and an axially extending driven tab;

a ring plate including a plurality of radially extending retention segments;

a piston plate including a plurality of axially extending clutch members; and, a carrier plate with a plurality of openings, wherein for each said arc spring a respective driving portion passes through the first opening into the passageway and a respective driven portion passes through the second opening into the passageway, wherein each radially extending segment from the plurality of radially extending segments at least partially encloses an arc spring from the plurality of arc springs, is connected to and rotatable with the arc spring, and radially restrains the arc spring, wherein each clutch member from the plurality of clutch members is circumferentially disposed between respective adjacent driving and driven spring segments and is engageable with the respective adjacent driving and driven spring segments, and wherein the axially extending driving and driven tabs are disposed in respective openings from the plurality of openings, are circumferentially displaceable within the opening, and are engageable with the carrier plate in a circumferential direction.

* * * * *